3,294,835
2-METHYL-2-BENZYLOXYMALONIC ACID MONOALKYL ESTERS
Albert Hofmann, Bottmingen, Basel-Land, and Paul Stadler, Biel-Benken, Basel-Land, Switzerland, assignors to Sandoz Ltd. (also known as Sandoz A.G.), Basel, Switzerland
No Drawing. Filed Nov. 27, 1963, Ser. No. 326,390
Claims priority, application Switzerland, Nov. 29, 1962, 13,999/62
10 Claims. (Cl. 260—473)

The present invention relates to new optically active esters of malonic acid and to a process for their preparation.

The new optically active esters of the invention correspond to the general formula:

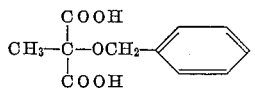

in which R represents an alkyl group containing from 1 to 4 carbon atoms inclusive.

The production of optically active 2-methyl-2-benzyloxymalonic acid semiesters is of importance in the synthesis of the peptide residue of natural and synthetic peptide-containing ergot alkaloids and thus also in the total synthesis of these alkaloids, since this peptide residue can be synthesised by condensing the corresponding acid chlorides, which are readily obtainable from these semiesters by known methods, with suitably substituted diketopiperazines with subsequent hydrogenolytic elimination of the benzyl group (see our U.S. applications Numbers 193,303, now abandoned and 298,410, now U.S. Patent No. 3,227,719). When a racemic malonic acid derivative is condensed with an optically active diketopiperazine, two diastereoisomeric compounds are obtained which are rather difficult to separate by crystallisation or chromatography. These difficulties can be avoided by using the appropriate optically active malonic acid semiester chloride. However, since it is practically impossible to resolve a racemic mixture of carboxylic acid halides, this has required in the past separation of the racemic 2-methyl-2-benzyloxy-malonic acid semiester into its optically active constituents, but—apart from the exceptions now unexpectedly discovered and described below—the rather impure, crude product obtained by this synthesis (by reacting the 2-bromo-2-methyl-malonic acid dialkyl ester with sodium benzylate, followed by hydrolysis to yield the semiester) is impossible to resolve into its optically active constituents by the methods conventionally used for carboxylic acids (for example via the cinchonidine or yohimbine salts) so that the crude semiester had to be purified.

It has now surprisingly been found that there exist two simple and relatively inexpensive ways of resolving crude, racemic 2-methyl-2-benzyloxymalonic acid monoalkyl esters in good yield.

According to the first method the semiester is converted in known manner into the corresponding acid halide (usually chloride) which is then purified by fractional distillation, and from it the pure racemic semiester is obtained by hydrolysis with 0.1 to 1 molecular proportion of pyridine in a mixture of water and an inert, organic solvent which dissolves both the semiester halide and the pyridine salt of the semiester. The pure, racemic semiester obtained in this manner is then resolved in conventional manner, via its salt with an optically active base e.g. cinchonidine or yohimbine.

According to the second process the crude, racemic 2-methyl-2-benzyloxymalonic acid monoalkyl esters are re-solved in conventional manner into the pure, optically active constituents via the anhydropilosine salts. Since, as mentioned above, the crude, racemic semiester cannot be resolved via the bases cinchonidine and yohimbine, which are conventionally used for such purpose, it was not to be expected that this separation could be achieved with anhydropilosine. Thus, it is possible also in this way to prepare from the primarily formed impure racemic semiester the (R)-(+)-2-methyl-2-benzyloxymalonic acid monoalkyl ester which is necessary for the synthesis of natural peptide-containing ergot alkaloid or of its peptide residue. From this monoalkyl ester it is easy to prepare pure (S)-(+)-2-methyl-2-benzyloxymalonic acid semiester chloride, advantageously using thionyl chloride as chlorinating agent and dimethylformamide as solvent.

In the following examples, which illustrate the invention, melting points are shown corrected.

EXAMPLE 1

Racemic 2-methyl-2-benzyloxymalonic acid monoethyl ester (crude product)

A solution of 577 g. (2.06 mols) of crude 2-methyl-2-benzyloxymalonic acid diethyl ester in 1730 ml. of anhydrous ethanol is cooled to +10° C. A solution of 118 g. (2.11 mols) of potassium hydroxide in 1150 ml. of absolute ethanol is then stirred in dropwise within ½ hour at 10 to 15° C., and the mixture is kept overnight at room temperature. Before working up the reaction mixture, the ethanol is expelled at a bath temperature of 50° C., the residue is diluted with 500 g. of ice, 500 ml. of saturated aqueous sodium bicarbonate solution and 300 ml. of water, and the aqueous alkaline solution is freed from the neutral phase by being extracted with 3 x 1 litre of toluene. The aqueous solution of the sodium salt of the semiester is then acidified with ice-cold dilute phosphoric acid (pH=2.5 to 3) and extracted with 3 x 1.5 litres of benzene, and the benzene extracts are washed with 2 x ½ litre of water and dried with 500 g. of sodium sulphate. The solvent is removed at 50 to 60° C., to leave the semiester in the form of a viscous, faintly yellowish oil. Refractive index $n_D^{20}$=1.5018.

EXAMPLE 2

Anhydropilosine salt of (R)-(+)-2-methyl-2-benzyloxymalonic acid monoethyl ester 359 g. (1.425 mols) of racemic 2-methyl-2-benzyloxymalonic acid monoethyl ester in 150 ml. of isopropanol are tipped into a hot solution of 382 g. (1.425 mols) of anhydropilosine in 750 ml. of isopropanol, the whole is cooled to 30° C., seeded, and allowed to crystallise overnight at room temperature. The mother liquor is extensively suctioned off from the precipitated crystalline substance, and the filter cake is rinsed with a mixture of isopropanol and heptane, recrystallised from a mixture of 450 ml. of isopropanol and 100 ml. of heptane, the mother liquor is removed, and the crystals are again rinsed with a mixture of 75 ml. of isopropanol and 25 ml. of heptane. After drying in a high vacuum, the pure anhydropilosine salt of (R)-(+)-2-methyl - 2 - benzyloxymalonic acid monoethyl ester is obtained in the form of withered, colourless rodlets melting at 102–103° C. Optical rotation $[\alpha]_D^{20}$=+24.5° (c.=2, in ethanol).

EXAMPLE 3

(R)-(+)-2-methyl-2-benzyloxymalonic acid monoethyl ester 200.5 g. (0.385 mol) of the anhydropilosine salt of (R)-(+)-2-methyl - 2 - benzyloxymalonic acid monoethyl ester (melting at 102–103° C.) are agitated alternately with 1½ litres of ether and 600 ml. of 2 N-sulphuric acid until all has dissolved, whereupon the sulphuric acid solution is extracted twice more with 1½ litres of ether on each occasion. To separate the anhydropilosine quantitatively from the semiester, the three ether solutions are extracted with 4 x 100 ml. of 2 N-sulphuric acid, then washed with water until the washings run neutral, thoroughly dried with sodium sulphate, and the ether is removed at 50° C. to yield the semiester as a faintly yellowish oil. Refractive index $n_D^{20}=1.5005$. Optical rotation $[\alpha]_D^{20}=9.5°$ (c.=2, in ethanol).

EXAMPLE 4

Racemic 2-methyl-2-benzyloxymalonic acid monoethyl ester chloride

A solution of 427 g. (1.69 mols) of crude racemic 2-methyl-2-benzyloxymalonic acid monoethyl ester (prepared as described in Example 1) in 450 ml. of absolute methylene chloride is cooled to +10° C. 135 g. (1.85 mols) of absolute dimethylformamide and then 135 ml. (220 g., 1.85 mols) of thionyl chloride are stirred in dropwise at +10° C., the whole is kept overnight at room temperature, and dimethylformamide and other readily volatile constituents are then distilled off at an oil bath temperature of 100° C. under a pressure of 11 mm. Hg. Distillation of the residue in a high vacuum furnishes the racemic acid chloride as a colourless oil boiling at 105–113° C. under 0.05 mm. Hg pressure. Refractive index $n_D^{22}=1.5004$.

EXAMPLE 5

Racemic 2-methyl-2-benzyloxymalonic acid monoethyl ester (pure product)

155 g. (1.96 mols) of pyridine are vigorously stirred dropwise at 20° C. within 20 minutes into 530 g. (1.92 mols) of racemic 2-methyl-2-benzyloxymalonic acid monoethyl ester chloride in 1 litre of acetone and 1 litre of water. To dissipate the released heat a cooling bath is required. The reaction mixture is then stirred for another 2 hours at 20° C. and worked up by being diluted with ice water, made alkaline with aqueous potassium carbonate solution, and the neutral phase is removed by three extractions with ether. The aqueous alkaline solution of the acid phase is acidified with ice-cold phosphoric acid of 30% strength to pH=2 and extracted three times with ether. The ether extracts are washed with water until the washings run neutral, dried with sodium sulphate and the solvent is cautiously evaporated, to yield the pure racemic semiester as a viscid oil of molecular weight 256. Refractive index $n_D^{21}=1.4998$, pK=5.28 (in 80% methylcellosolve).

EXAMPLE 6

Cinchonidine salts of (S)-(−)- and (R)-(+)-2-methyl-2-benzyloxymalonic acid monoethyl ester 541.5 g. (1.84 mols) of cinchonidine and 465.5 g. (1.84 mols) of racemic 2-methyl-2-benzyloxymalonic acid monoethyl ester (prepared as described in Example 5) are dissolved in 1.82 litres of hot absolute ethanol. The whole is allowed to cool slowly to 20° C., whereupon the bulk of the cinchonidine salt of the laevorotatary antipode crystallises out. The batch is kept for 3 hours at 20° C., thoroughly suction-filtered, and the filter cake is twice rinsed well with a mixture of 80% of ether and 20% of ethanol, to yield the optically pure cinchonidine salt of (S)-(−)-2-methyl-2-benzyloxymalonic acid monoethyl ester in colourless, long, slanting parallelepipeds melting at 155–156° C. with decomposition. Optical rotation $[\alpha]_D^{20}=-68.8°$ (c.=2, in ethanol). A specimen of the salt was further recrystallised twice from ethanol; no change in the melting point or in the rotation was observed. The semiester liberated from this salt after three recrystallisations displayed within the margins of error the identical rotation as the semiester that had been liberated from the bulk of the substance.

To purify the cinchonidine salt of the dextrorotatary semiester present in the mother liquor, the latter is evaporated to dryness, whereupon the residue crystallises. The crystalline residue is digested with enough hot ethyl acetate to dissolve the bulk of the readily soluble cinchonidine salt of the dextrorotatary semiester while leaving an insoluble residue, which is filtered off while hot, consisting predominantly of the cinchonidine salt (which is more sparingly soluble in ethyl acetate) of the laevorotatary semiester still present. On cooling, the solution furnishes a crystallisate which, after 3 further recrystallisations from ethyl acetate, yields the optically pure cinchonidine salt of (R)-(+)-2-methyl-2-benzyloxymalonic acid monoethyl ester in colourless, fine needles melting at 134° C. with decomposition. Optical rotation $[\alpha]_D^{20}=-64.4°$, $[\alpha]_{578}^{20}=-70.4°$, $[\alpha]_{546}^{20}=-82.4°$ (c.=1.6, in ethanol).

EXAMPLE 7

(S)-(−)-2-methyl-2-benzyloxymalonic acid monoethyl ester 190 g. (0.348 mol) of the cinchonidine salt of (S)-(−)-2-methyl-2-benzyloxymalonic acid monoethyl ester (melting at 155–156° C.) are agitated alternately with 1½ litres of ether and 600 ml. of 2 N-sulphuric acid until all has dissolved. The sulphuric acid solution is then extracted further with 2 x 1 litre of ether. To free the ether solutions completely from cinchonidine they are further agitated with 3 x 200 ml. of 2 N-sulphuric acid, and then washed with water until the washings run neutral and dried. After having cautiously expelled the solvent, the (S)-(−)-2-methyl-2-benzyloxymalonic acid monoethyl ester is obtained as a viscid, substantially colourless oil. Refractive index $n_D^{20}=1.4990$. Optical rotation $[\alpha]_D^{20}=-10.3°$ (c.=4.3, in ethanol).

EXAMPLE 8

(R)-(+)-2-methyl-2-benzyloxymalonic acid monoethyl ester 90.0 g. (0.165 mol.) of the cinchonidine salt of (R)-(+)-2-methyl-2-benzyloxymalonic acid monoethyl ester (melting at 134° C.) are split with the use of ester and 2 N-sulphuric acid in the same manner as described for the cinchonidine salt of the laevorotatary semiester. There is obtained the (R)-(+)-2-methyl-2-benzyloxymalonic acid monoethyl ester as a viscous, substantially colourless oil. Refractive index $n_D^{23}=1.5023$. Optical rotation $[\alpha]_D^{20}=+10.1°$, $[\alpha]_{578}^{20}=+10.0°$, $$[\alpha]_{546}^{20}=+11.4°$$

(c.=5.41, in ethanol).

EXAMPLE 9

(S)-(+)-2-methyl-2-benzyloxymalonic acid monoethyl ester chloride 8.6 g. of anhydrous dimethylformamide and then 14 g. of freshly distilled thionyl chloride are stirred dropwise at +5° C. in 27.0 g. of (R)-(+)-2-methyl-2-benzyloxymalonic acid monoethyl ester (which has been separated via the anhydropilosine salt and purified) in 50 ml. of anhydrous methylene chloride. The reaction mixture is kept overnight at room temperature, and the volatile constituents are distilled off first under vacuum at an oil bath temperature of up to 100° C., followed by high vacuum distillation of the residue. The product boils at 105–107° C. under 0.01 mm. Hg pressure. Refractive index $n_D^{21}=1.5002$. Optical rotation $[\alpha]_D^{20}=+28.2°$ (c.=2, in benzene).

EXAMPLE 10

(R)-(−)-2-methyl-2-benzyloxymalonic acid monoethyl ester chloride 176.9 g. of (S)-(−)-methyl-benzyloxymalonic acid monoethyl ester in 200 ml. of anhydrous methylene chloride are mixed with 55.5 g. of anhydrous dimethyl formamide and the whole is cooled to +10° C. In the course of one hour at +10° C. 55.5 ml. of freshly distilled thionyl chloride are added dropwise and the mixture is kept for 2 days at 20° C. The volatile constituents are then expelled in a water-jet vacuum, at first at room temperature and then in an oil bath maintained at 100° C., to remove the dimethyl formamide, accompanied by small amounts of other, unknown products. The residue is then distilled in a high vacuum; the product boils at 98–106° C. under 0.002 mm. Hg pressure. Refractive index $n_D^{21}=1.5001$. Optical rotation $[\alpha]_D^{20}=-26.7°$ (c.=5, in benzene).

EXAMPLE 11

*Resolving pure racemic 2-methyl-2-benzyloxymalonic acid monoethyl ester via the yohimbine salt*

5.0 g. (0.0198 mol.) of racemic 2-methyl-2-benzyloxymalonic acid monoethyl ester, previously purified via the racemic acid chloride, in admixture with 7.01 g. (0.0198 mol.) of yohimbine, are dissolved in ethanol and the solution is evaporated almost to dryness. The oily residue is taken up in ethyl acetate, seeded with a trace of (R)-(+)-2-methyl - 2 - benzyloxymalonic acid monoethyl ester yohimbinate, whereupon the optically pure yohimbine salt of the dextrorotatary semiester crystallises out in colourless needles melting at 157° C. with decomposition. Optical rotation $[\alpha]_D^{20}=34°$ (c.=0.5, in ethanol).

The (R)-(+) - 2 - methyl - 2 - benzyloxymalonic acid monoethyl ester liberated from the above salt with the aid of ether and 2 N-sulphuric acid is in every respect identical with the above-described semiester, obtained via the anhydropilosine and cinchonidine salts, and displays a positive rotation.

What is claimed is:
1. An optically active compound of the formula:

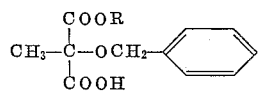

wherein R is an alkyl group of from 1 to 4 carbon atoms inclusive.

2. A dextrorotatory isomer of a compound of the formula:

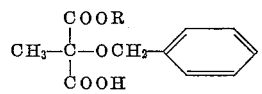

wherein R is an alkyl group from 1 to 4 carbon atoms inclusive.

3. A levorotatory isomer of a compound of the formula:

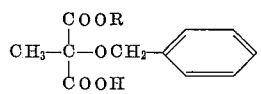

wherein R is an alkyl group from 1 to 4 carbon atoms inclusive.

4. (R)-(+)-2-methyl-2-benzyloxymalonic acid monoethyl ester.
5. (S)-(—)-2-methyl-2-benzyloxymalonic acid monoethyl ester.
6. An optically active compound of the formula:

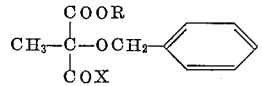

wherein R is an alkyl group of from 1 to 4 carbon atoms inclusive and X is a member selected of the group consisting of chlorine, bromine and iodine.

7. A dextrorotatory isomer of a compound of the formula:

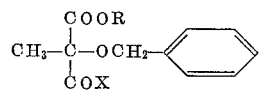

wherein R is an alkyl group of from 1 to 4 carbon atoms inclusive and X is a member selected of the group consisting of chlorine, bromine and iodine.

8. A levorotatory isomer of a compound of the formula:

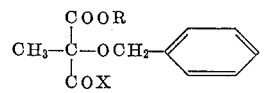

wherein R is an alkyl group of from 1 to 4 carbon atoms inclusive and X is a member selected of the group consisting of chlorine, bromine and iodine.

9. (S)-(+)-2-methyl-2-benzyloxymalonic acid monoethyl ester chloride.
10. (R)-(—)-2-methyl-2-benzyloxymalonic acid monoethyl ester chloride.

References Cited by the Examiner

Blicke et al.: "Journal of American Chemical Society," vol. 63 (1941) pp. 2779–2781.

LORRAINE A. WEINBERGER, *Primary Examiner.*

S. B. WILLIAMS, *Assistant Examiner.*